June 19, 1951 F. J. CARNEY 2,557,497
SELF-LUBRICATING PISTON
Filed Nov. 18, 1948 2 Sheets-Sheet 1

INVENTOR
FRED J. CARNEY
BY
Florian L Miller
ATTORNEY

June 19, 1951  F. J. CARNEY  2,557,497
SELF-LUBRICATING PISTON

Filed Nov. 18, 1948  2 Sheets-Sheet 2

INVENTOR.
FRED J. CARNEY
BY

Patented June 19, 1951

2,557,497

UNITED STATES PATENT OFFICE 2,557,497

SELF-LUBRICATING PISTON

Fred J. Carney, Erie, Pa., assignor to Bury Compressor Company, Erie, Pa., a corporation of Pennsylvania Application November 18, 1948, Serial No. 60,810

5 Claims. (Cl. 309—4)

This invention relates generally to pistons and more particularly to self-lubricating pistons.

In many uses of fluid compressors, such as air compressors in food processing plants and compressors used for flammable gases, use of a lubricant in the cylinder is absolutely prohibited. Different types of fillers, more in the nature of piston rings, have been used on metal pistons, such as annular, fibre composition members, but these fillers had a comparatively small peripheral area in engagement with the inner side of the cylinders with the result that they wore quickly, there was always an excessive leakage past the piston, frequent replacements were required, and they were difficult to install on a piston. Furthermore, it was necessary to remove the piston from the cylinder to replace these fillers.

I have found that a comparatively large area of the periphery of a piston, and especially a non-metallic piston, must necessarily be provided for engaging the inner wall of a cylinder as the maximum wear is on this area of the piston. This insures the maximum length of service in that the wear is more evenly distributed over a large area of the peripheral surface of the piston. None of the previous designs of pistons for oil-free service have had a self-lubricating peripheral surface.

It is, accordingly, an object of my invention to overcome the above and other defects in self-lubricating pistons and it is more particularly an object of my invention to provide a self-lubricating piston which is simple in construction, economical in cost, economical in manufacture, efficient in operation, and easily installed and removed from a cylinder.

Another object of my invention is to provide a non-metallic self-lubricating piston with peripheral grooves for supporting sealing rings of the same material.

Another object of my invention is to provide a self-lubricating piston with a self-lubricating, non-metallic, peripheral surface giving a maximum peripheral bearing surface in engagement with a cylinder wall.

Another object of my invention is to provide a piston having a self-lubricating outer peripheral portion which may be removed and replaced in the cylinder without removing the piston therefrom.

Another object of my invention is to provide a self-lubricating carbon piston for a compressor for oil-free compressor service in which the outer peripheral surface of the piston gives the maximum peripheral bearing surface in engagement with the inner side of a cylinder.

Another object of my invention is to provide a carbon carrier ring between shrouds or flanges which can be adjusted laterally to compensate for any looseness of the carbon carrier ring body.

Another object of my invention is to provide a self-lubricating, non-metallic piston in which the power put into the compressor is carried through metal to metal contact members forming the body of the piston.

Another object of my invention is to provide a carbon piston in which any shock contact between the carbon piston and the cylinder heads is prevented.

Other objects of my invention will become evident from the following detailed description, taken in conjunction with the accompanying drawings, in which Fig. 1 is a vertical sectional view of a preferred embodiment of my novel self-lubricating piston taken on the line 1—1 of Fig. 2;

Figure 1:
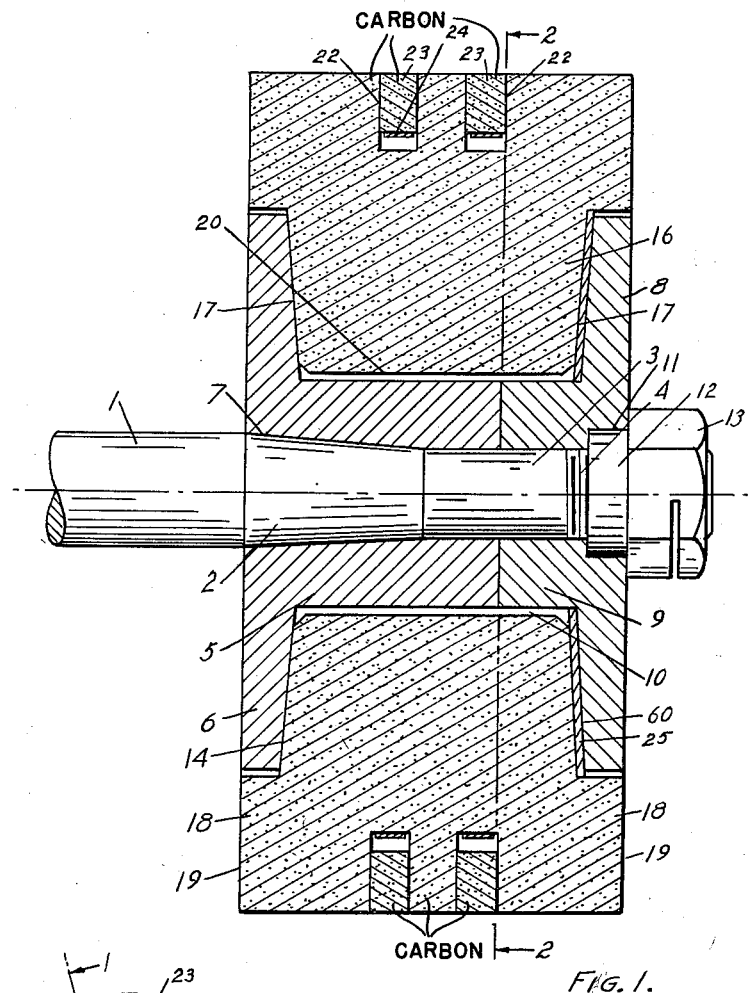
Figure 2:
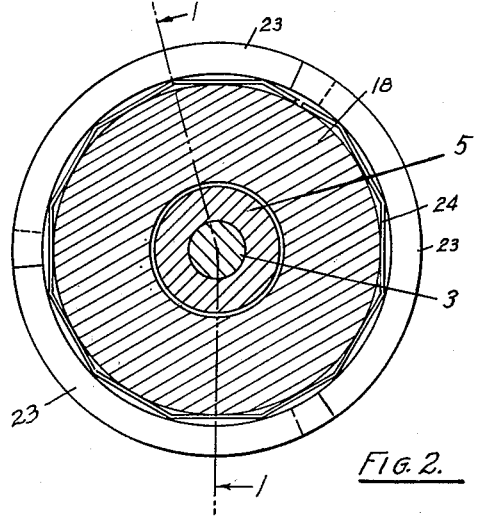
Fig. 2 is a view taken on the line 2—2 of Fig. 1.

Referring now to the drawings, I show in Figs. 1 and 2 a piston rod 1 having a tapered portion 2 and a reduced end portion 3 threaded at 4. A cylindrical shroud or body member 5 with an end flange 6 has a partially tapered bore 7 complementary to the tapered portion 2 and the reduced portion 3 of the end of the piston rod 1 so that it may be mounted thereon as shown in Figs. 1 and 2. An end flange or follower 8 having an inwardly bossed portion 9 is disposed on the reduced end 3 of the piston rod 1 and it complements the member 5 to form a generally rectangular shaped, annular groove 10. The follower 8 has a recessed portion 11 for receiving the projecting portion 12 of a lock nut 13 which threadably engages the threaded portion 4 of the piston rod 1 to secure the members 5 and 8 on the end thereof. The inner side 60 of the follower 8 and the inner side 14 of the flange 6 on the member 5 are tapered or flared outwardly. An annular self-lubricating carrier ring 16 has the sides 17 thereof tapered for engagement with the tapered inner sides 60 and 14 of the follower 8 and the flange 6 of the member 5. The ring 16 has laterally extending portions 18 adjacent the periphery thereof which over-hang the outer peripheral surfaces of the follower 8 and the flange 6 on the body member 5. The over-hanging portions 18 greatly increase the area of the peripheral portion of the ring 16 in engagement with the inner wall of a cylinder. The lateral side surfaces 19 of the over-hanging portions 18 of the member 16 are offset inwardly a very slight amount from the outer faces of the follower 8 and the flange 6 on the member 5 to prevent the faces 19 or any other portion of the ring 16 to come into engagement with the heads of a cylinder in which the piston is disposed. The bore 20 of the ring 16 is slightly larger than the diameter of the body member 5 and the bossed portion 9 of the follower 8 so as to permit a small amount of clearance therebetween and also to facilitate the assembly and disassembly of the ring 16. A slight clearance is also provided between the outer periphery of the follower 8 and the flange 6 on the member 5 and the over-hanging portions 18 of the carrier ring 16. The ring 16 has outer peripheral grooves 22 for receiving segmental sealing rings 23. These segmental rings 23 are of a conventional type and they are urged outwardly for sealing engagement with a cylinder by flat spring members 24. Shims 25 are provided between the tapered surface 60 of the follower 8 and a complementary tapered side 17 of the ring 16 to compensate for any looseness of the ring 16.

The slight taper on the inside face 60 of follower 8 and tapered portion 14 of the flange 6 on the member 5 throws the tension on the tapered portions 17 of the ring 16 outwardly from the inner bore 20 thereof thus preventing the lateral crushing of the ring 16 between the follower 8 and the flange 6 on the member 5.

Figure 3:
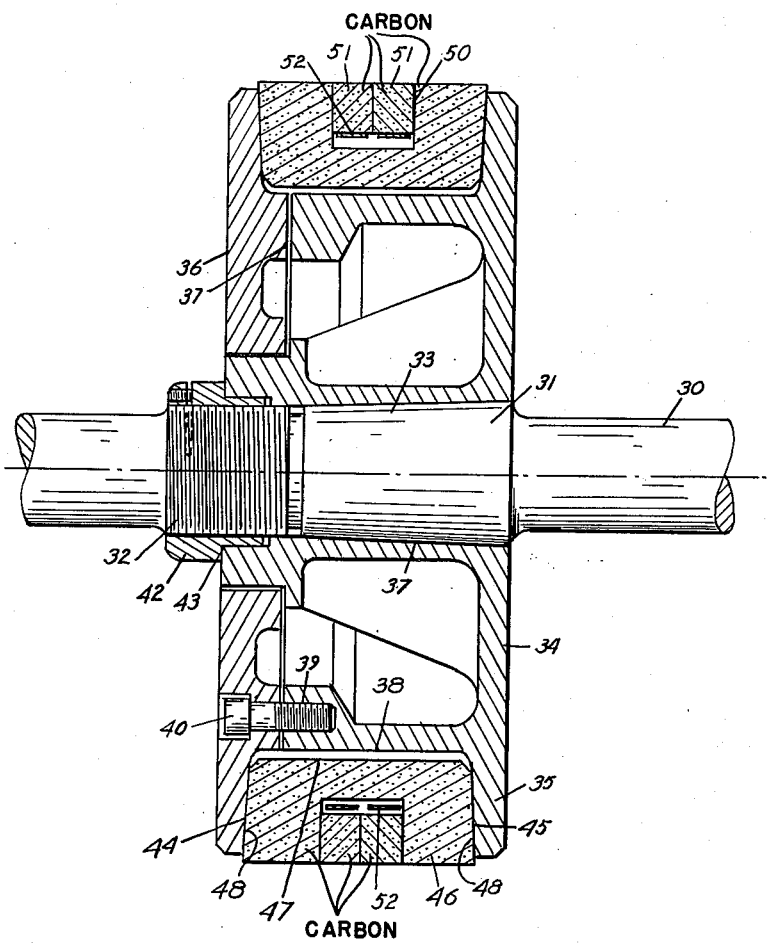
Fig. 3 is a vertical sectional view of a modified form of my novel self-lubricating piston.

In Fig. 3, I show a modified form of my invention which is particularly adaptable for larger sizes of pistons. Referring now to Fig. 3, I show a piston rod 30 having an enlarged tapered portion 31 and a threaded portion 32 for receiving the tapered bore 33 of a cylindrical body member 34 having an outwardly directed flange 35. An end plate or follower 36 having an inwardly bossed portion 37 complements the member 34 to provide an annular groove 38. The follower 36 is secured to the member 34 by means of threaded apertures 39 in the member 34 and bolts 40 which secure the follower 36 and the bossed portion 37 thereof into engagement with the member 34. A threaded member 42 with an off-set portion 43 to engage the follower 36 threadably engages the threaded portion 32 of the piston rod 30 to secure the members 34 and 36 on the tapered portion 31 of the piston rod 30. The inner sides 44 and 45 of the follower 36 and the flange 35 on the member 34 respectively are slightly tapered. A self-lubricating ring 46 having a bore 47 somewhat larger than the diameter of the body member 34 is disposed between the follower 36 and the flange 35 on the member 34 as shown in Fig. 3. The ring 46 has tapered sides 48 complementary to the tapered inner sides 44 and 45 of the follower 36 and flange 35 on the member 34 respectively. An outer peripheral groove 50 is provided in the ring 46 for the reception of segmental sealing rings 51 which are urged outwardly by springs 52.

I prefer to use a self-lubricating carbon in my carrier rings and sealing rings because it is a comparatively hard material, it will withstand maximum wear, and it is self-lubricating.

It will be evident upon inspecting the pistons shown in Figs. 1 and 3 that the followers 8 and 36 respectively may be removed while the piston is in the cylinder and the carrier rings 16 and 46 respectively may be removed and replaced while the piston is in a cylinder. The sealing rings may also be removed and replaced in a minimum of time.

It will be evident from the foregoing description that I have provided a novel self-lubricating piston for oil-free cylinder use in compressors or fluid pumps in which the self-lubricating material of the piston has a maximum bearing surface, one in which any looseness of the carrier ring body between the shrouds or flanges can be compensated for by shims, one which does not require removal from a cylinder to remove or replace sealing rings or the carrier ring on the piston, one in which the carrier ring and the sealing rings are made of the same self-lubricating material, one in which all of the power is carried through metal to metal contact, and one in which shock contact between the carbon portion of the piston and cylinder heads is prevented.

Various changes may be made in the specific embodiment of my invention without departing from the spirit thereof or from the scope of the appended claims.

What I claim is:

1. A self-lubricating piston for disposal on a piston rod comprising a cylindrical member having an outwardly directed end flange, a comparatively wide annular carbon ring having an annular groove in the periphery thereof for disposal on said cylindrical member abutting said flange, an end plate engaging and complementary to said cylindrical member and opposite to said flanged portion thereof for engaging one side of said carbon ring, the outer periphery of said carbon ring extending outwardly from the outer periphery of said flanged portion of said cylindrical member and said end plate, a carbon sealing ring in said groove, and means for securing said cylindrical member and said end plate on said piston rod with said carbon ring secured therebetween, the peripheral area of said carbon ring consisting of the entire peripheral area of the piston.

2. A self-lubricating piston for disposal on a piston rod comprising mated, flanged, complementary cylindrical members defining a substantially rectangular shaped annular groove between the flanged portions thereof, an annular, comparatively wide, self-lubricating ring disposed in the annular groove between the flanged portions of said mated members having recessed sides for nesting the flanges on said cylindrical members, said ring having a peripheral groove therein, an annular, self-lubricating sealing ring disposed in said peripheral groove, the peripheral surface of said self-lubricating ring consisting of the entire peripheral surface of the piston, and means for securing said mated flanged members on a piston rod.

3. A self-lubricating piston comprising mated, flanged, cylindrical members defining a substantially rectangular shaped annular groove between the flanged portions thereof, means for securing said flanged members together on a piston rod, a comparatively wide, self-lubricating annular ring disposed in said groove and secured by said flanged members having a peripheral groove in the outer periphery thereof, the outer periphery of said ring extending outwardly from the outer periphery of the flanges on said flanged members, and a self-lubricating sealing ring disposed in said peripheral groove in said self-lubricating annular ring.

4. A self-lubricating piston comprising mated flanged cylindrical members having spaced opposed flanges with the inner sides thereof tapered and defining an annular groove with the sides thereof flared laterally outwardly between the flanges on said cylindrical members, means for securing said flanged members together on a piston rod, a self-lubricating, comparatively wide carbon ring having an outer peripheral groove disposed in said groove defined by the flanges on said flanged members and secured thereby, the opposite sides of said ring being tapered complementary to the tapered inner sides of the flanges on said flanged members, and a self-lubricating carbon sealing ring disposed in said peripheral groove, the outer peripheral surface of said annular self-lubricating ring being of comparatively large peripheral area and consisting of the entire peripheral area of the piston.

5. A self-lubricating piston as set forth in claim 4 wherein said carbon ring has lateral portions thereof over-hanging said flanges on said cylindrical members whereby a maximum bearing surface is in engagement with a cylinder wall.

FRED J. CARNEY.

REFERENCES CITED

The following references are of record in the file of this patent:

UNITED STATES PATENTS

| Number | Name | Date |
| --- | --- | --- |
| 112,685 | Cameron | Mar. 14, 1871 |
| 654,211 | Wilson | July 24, 1900 |
| 1,426,022 | Thomson | Aug. 15, 1922 |
| 1,498,835 | Calta | June 24, 1924 |
| 2,062,808 | Davis | Dec. 1, 1936 |
| 2,092,086 | Saharoff | Sept. 7, 1937 |
| 2,092,087 | Saharoff | Sept. 7, 1937 |
| 2,295,521 | Payne et al. | Sept. 8, 1942 |
| 2,419,192 | Anderson | Apr. 22, 1947 |